Feb. 3, 1925. 1,525,324
C. C. RICH
BATTERY SEPARATOR AND JAR
Filed Aug. 9, 1922   2 Sheets-Sheet 1
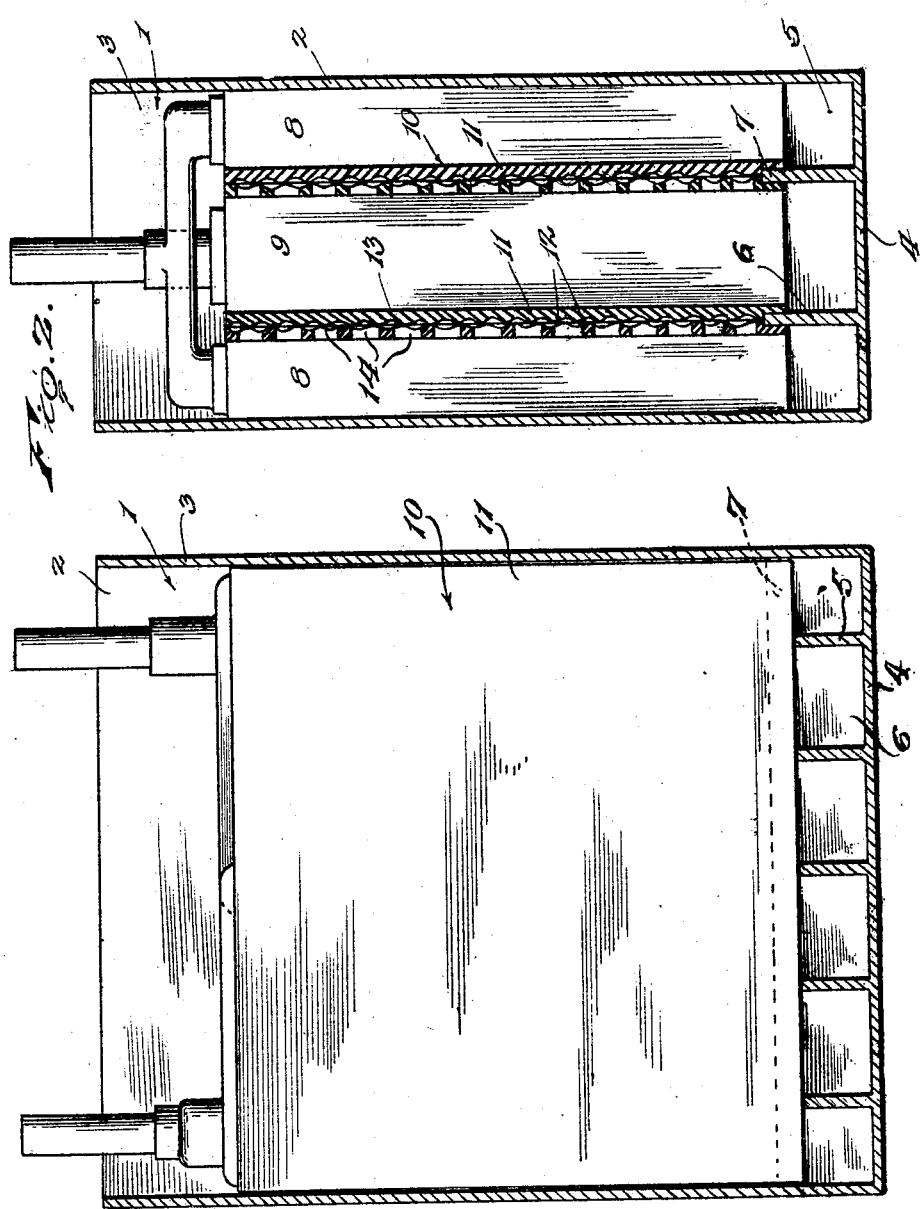

Feb. 3, 1925.
C. C. RICH
BATTERY SEPARATOR AND JAR
Filed Aug. 9, 1922
1,525,324
2 Sheets-Sheet 2

Inventor
C. C. Rich.
By Lacey & Lacey, Attorneys

Patented Feb. 3, 1925.

1,525,324

UNITED STATES PATENT OFFICE.

CHARLES C. RICH, OF MOUNT VERNON, NEW YORK, ASSIGNOR OF ONE-TWENTIETH TO CHARLES WINTERMEYER, OF MOUNT VERNON, NEW YORK.

BATTERY SEPARATOR AND JAR.

Application filed August 9, 1922. Serial No. 580,790.

*To all whom it may concern:*

Be it known that I, CHARLES CLAYTON RICH, a citizen of the United States, residing at Mount Vernon, in the county of Westchester and State of New York, have invented certain new and useful Improvements in Battery Separators and Jars, of which the following is a specification.

This invention relates to improvements in storage batteries.

One of the causes of failure of storage batteries is the accumulation of the sediment precipitated from the electro-active material of the grids in such a manner as to bridge the space between the grids of opposing polarity thereby producing internal short circuits. This is also brought about, but to a minor extent, by the growth of lead trees upon the negative grids. Therefore, it is one of the primary objects of the present invention to provide against the bridging of the battery elements, and the consequent short circuiting, either through the accumulation of sediment precipitated from the active material of the grids or from the growth of lead trees. Therefore, the invention contemplates the provision of a battery which will retain its efficiency for a much longer period of time than batteries of ordinary constructions now in general use.

In the ordinary storage battery, separators of porous material as, for example, wood, are interposed between the grids or plates of opposite polarity for the purpose of insulating the same, and the degree of freedom with which the electrolyte circulates within the battery depends to a great extent upon the porosity of the separators. While such separators permit of the battery elements being brought relatively close together, yet by reason of their character, the internal resistance of the battery is materially increased. Therefore, it is another important object of the invention to provide a separator so constructed as to permit of freer circulation of the electrolyte than is possible where wooden separators are employed.

In carrying out the invention perforate separators are employed between the positive and negative plates and it is another important object of the invention to so construct the separators that while there may be a free circulation of the electrolyte, the circulating passages through the separator plates will be of a tortuous nature so as to preclude any bridging of the plates of opposite polarity either through the accumulation of sediment to a level with the openings or passages, or the lodgment of scales of active material within said openings.

Another disadvantage presented by the ordinary wooden separator is that in the event of distortion of the battery elements it is liable to be pierced thereby thus permitting portions of the elements to come into contact with each other and short circuit the battery. Therefore, the present invention has as a further important object to provide a separator constructed to avoid short circuiting from this cause.

In the accompanying drawings:

Figure 1 is a vertical longitudinal sectional view through a battery embodying the invention, the section being taken in a plane with the outer face of one of the separators;

Figure 2 is a vertical transverse sectional view, the battery grids being shown in end elevation;

Figure 3:
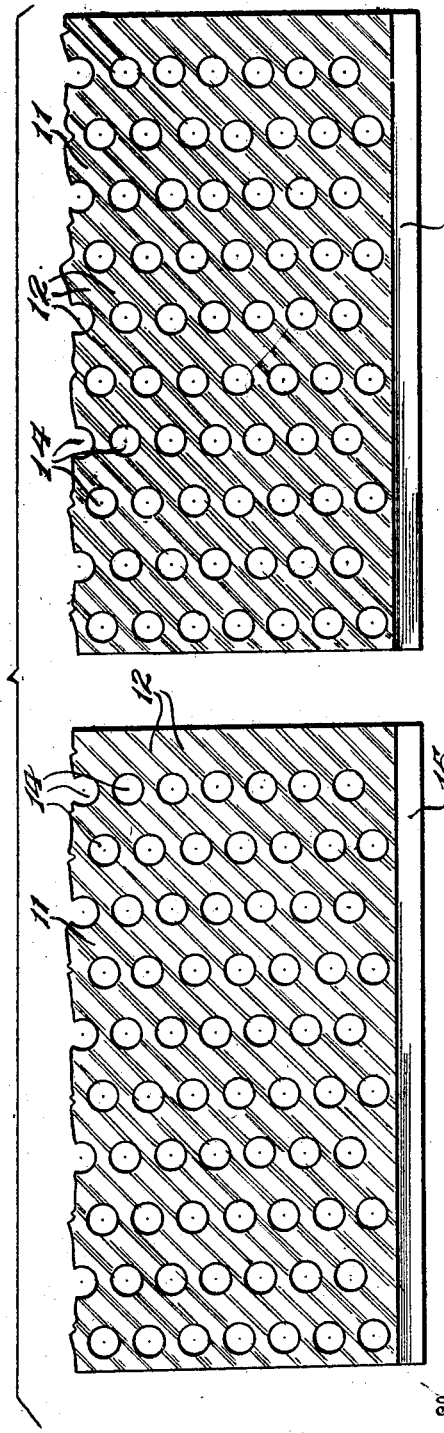
Figure 3 is a group view illustrating the two component plates of a separator formed in accordance with the invention.
Figure 5:
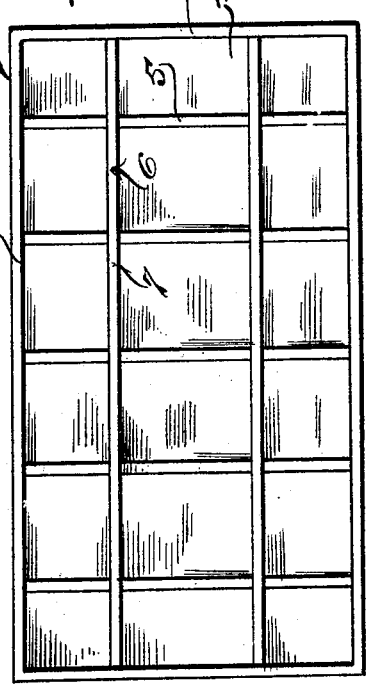
Figure 5 is a top plan view of the battery jar.

In the drawings the battery jar is indicated in general by the numeral 1 and the same comprises side walls 2, end walls 3, and a bottom 4. The jar 1 is provided in the bottom portion of its interior with means for supporting the battery plates and separators, to be hereinafter described, and the said supporting means comprises transverse partitions 5 which extend between the side walls 2 and are spaced apart at suitable intervals throughout the length of the said bottom of the jar. Other partitions 6 are provided within the bottom portion of the jar and intersect the partitions 5 and at their upper edge portions project a suitable distance above the upper edges of the partitions 5, as indicated by the numeral 7. The battery plates are indicated by the numerals 8 and 9, the plates 8 being negative plates and the plate 9 a positive plate and arranged between the said plates 8. These plates are preferably of the construction disclosed in my patent issued June 10, 1924, No. 1,496,829. The plates 8 and 9 are supported upon the upper edges of the partitions 5 as clearly shown in Figures 1 and 2 of the drawings, and the partitions 6 are located in planes between the plates 8 and 9, and the separators heretofore referred to and indicated in general by the numeral 10 are likewise arranged between the said plates.

Figure 4:
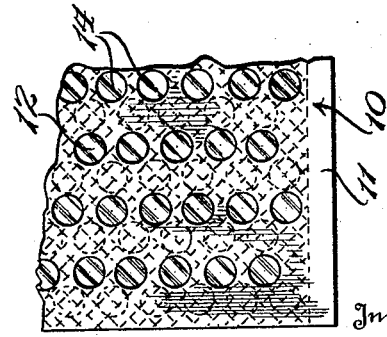
Figure 4 is a fragmentary view in elevation illustrating the relative arrangement of the openings in the two members or sections of the separator.

Each of the separators 10 comprises a pair of plates 11 of rubber or any other insulating material found suitable for the purpose, and each plate, upon one face, is provided with diagonal corrugations 12, and these corrugations, in companion plates, are so formed and positioned that when the plates are assembled face to face to form the separator, the ridges of the corrugations will cross or intersect one another, thus providing a relatively large number of tortuous passageways indicated by the numeral 13. Each plate is also formed with a plurality of vertically extending series of openings indicated by the numeral 14, and the openings are arranged in staggered relation as clearly shown in the two views of Figure 3. The rows of openings in each plate are located on parallel lines and, viewing the corrugated faces of the plates, the lines of openings are correspondingly positioned in the two companion plates. However, when the plates are assembled face to face, it will be found, as illustrated in Figure 4, that the openings in the two plates will be out of alinement, or in other words, displaced with relation to the approximately corresponding openings in the other plate. As a result there can be no circulation of the electrolyte on straight lines directly through the plates, but the circulation must be along more or less indirect lines. In fact, the openings and the corrugations defining the passages 13 insure of a more or less tortuous circulation of the electrolyte through the plates.

The separators 10 have their corrugated faces rabbeted along their lower edges as indicated by the numeral 15 so that when the plates are assembled grooves will be provided in the lower edges of the separators to receive the projecting upper edge portions 7 of the partitions 6 as clearly shown in Figure 2.

From the foregoing description of the invention it will be understood that by rabbeting the lower edges of the separator plates to provide grooves snugly receiving the projecting upper edge portions 7 of the partitions 6, a seal is provided at the joint between these parts thus effectually preventing bridging of the plates of opposite polarity through the accumulation of sediment precipitated from the active material of the plates. In fact, if it were not for the provision of this seal between the partition walls 6 and the separators 10, the positive and negative plates would be electrically bridged and an internal short circuit would be established as soon as the accumulated sediment had reached the level of the undersides of the frames of the plates. In view of the structure provided, however, short circuiting cannot take place from this cause even should the accumulated sediment rise to a level above the plane of the undersides of the said plates. Furthermore, inasmuch as the pasages through the separators are of a tortuous nature, even should the accumulated sediment rise to the level of one or more of the openings 14 in the separator plates, bridging of the associated positive and negative plates would not be liable to occur. Likewise in the event of formation of a lead tree upon the negative plate or plates, the growth of the tree would not be in a direct line between the plates but, because of the tortuous nature of the passages through the separators, would be more or less irregular and indirect thereby rendering it extremely unlikely that short circuiting would ever occur from this cause.

It will also be evident from the foregoing description that while the plates comprising each separator may be of hard rubber or some other non-porous and non-conducting material and therefore not subject to softening and disintegration to an extent to permit of mutual contact between the battery plates of opposite polarity, as where wooden separators are employed, the internal resistance offered by the separator plates and by the further spacing of the battery plates is less or at least not greater than that offered in the ordinary battery employing such wooden separators, due to the fact that the passages through the separators in the present case permit of perfect freedom of circulation of the electrolyte.

As heretofore stated the partition walls 5 and 6 are arranged in intersecting planes and it is evident therefore that the lower portion of the battery jar is divided into a number of relatively small compartments in which the precipitated sediment from the battery plates may accumulate, and the mass of sediment being thus divided up into relatively small portions, accumulation of the sediment in any considerable mass at any one point in the bottom of the jar is prevented.

Having thus described the invention, what is claimed as new is:

1. A separator for storage battery plates comprising companion plates assembled face to face and provided in their meeting faces with diagonal passageways, and having openings therethrough in communication with the passageways, the passageways being out of registration with each other whereby to provide for the tortuous circulation of the electrolyte through the plates.

2. A separator for storage battery plates comprising companion plates assembled face to face and provided in their meeting faces with diagonal passageways, and having openings formed therethrough in communication with the passageways, the passageways being out of registration with each other whereby to provide for the tortuous circulation of the electrolyte through the plates, the said openings being out of alinement in the two plates.

3. In a storage battery, a battery jar having a partition in its bottom portion, battery plates supported within the jar at opposite sides of the partition, and a separator arranged between the plates and having a sealed connection with the upper edge portion of the partition.

4. In a storage battery, a battery jar having partitions in its bottom portion arranged in intersecting planes, certain of the partitions projecting at their upper portions above the plane of the upper edges of the other partitions, plates supported upon the upper edges of the other partitions and located at opposite sides of the projecting portion of the first-mentioned partitions, and separators arranged between the plates and having grooves in their lower edges receiving the said projecting portions of the partitions.

5. In a storage battery, a battery jar, battery plates supported within the jar, a separator arranged between the plates, and a wall dividing the bottom portion of the interior of the jar below the lower edge of the separator and substantially in a plane therewith, the separator having a groove in its lower edge receiving the upper edge of said wall, the separator having passages therethrough for the circulation of the electrolyte.

In testimony whereof I affix my signature.

CHARLES C. RICH. [L. S.]